US012765628B2

(12) United States Patent
Kormann et al.

(10) Patent No.: US 12,765,628 B2
(45) Date of Patent: Oct. 20, 2026

(54) SPORTS SHOES AND METHODS FOR MANUFACTURING AND RECYCLING OF SPORTS SHOES

(71) Applicant: adidas AG, Herzogenaurach (DE)

(72) Inventors: Marco Kormann, Herzogenaurach (DE); Christopher Edward Holmes, Herzogenaurach (DE); Brian Hoying, Herzogenaurach (DE); Adam Martin Brundage, Portland, OR (US)

(73) Assignee: adidas AG, Herzogenaurach (DE)

( * ) Notice: Subject to any disclaimer, the term of this patent is extended or adjusted under 35 U.S.C. 154(b) by 938 days.

(21) Appl. No.: 17/178,838

(22) Filed: Feb. 18, 2021

(65) Prior Publication Data

US 2021/0195985 A1 Jul. 1, 2021

Related U.S. Application Data

(62) Division of application No. 16/139,797, filed on Sep. 24, 2018, now Pat. No. 10,952,489, which is a division of application No. 15/130,012, filed on Apr. 15, 2016, now abandoned.

(30) Foreign Application Priority Data

Apr. 16, 2015 (DE) ........................ 102015206900.1

(51) Int. Cl.

| | |
|---|---|
| ***B29B 17/02*** | (2006.01) |
| ***A43B 1/00*** | (2006.01) |
| ***B29B 17/00*** | (2006.01) |
| ***B29D 35/06*** | (2010.01) |
| ***G06Q 50/04*** | (2012.01) |
| ***G06Q 99/00*** | (2006.01) |
| *A43B 13/04* | (2006.01) |
| *A43B 13/12* | (2006.01) |
| *A43B 23/02* | (2006.01) |

(52) U.S. Cl.

CPC ............ *A43B 1/0063* (2013.01); *B29B 17/02* (2013.01); *B29D 35/068* (2013.01); *G06Q 50/04* (2013.01); *G06Q 99/00* (2013.01); *A43B 13/04* (2013.01); *A43B 13/12* (2013.01); *A43B 23/0215* (2013.01); *A43B 23/0255* (2013.01); *B29B 2017/0089* (2013.01); *B29D 35/065* (2013.01); *B29D 35/067* (2013.01); *Y02P 70/62* (2015.11); *Y02W 30/62* (2015.05)

(58) Field of Classification Search

CPC ...... B29B 17/00–0412; B29B 2017/001–0496
See application file for complete search history.

(56) References Cited

U.S. PATENT DOCUMENTS

| | | | |
|---|---|---|---|
| D64,898 | S | 6/1924 | Gunlock |
| 2,131,756 | A | 10/1938 | Roberts |
| 2,968,106 | A | 1/1961 | Joiner et al. |
| 3,186,013 | A | 6/1965 | Glassman et al. |
| 3,586,003 | A | 6/1971 | Baker |
| D237,323 | S | 10/1975 | Inohara |
| 4,132,016 | A | 1/1979 | Vaccari |
| 4,364,189 | A | 12/1982 | Bates |
| 4,413,431 | A | 11/1983 | Cavanagh |
| 4,481,727 | A | 11/1984 | Stubblefield et al. |
| 4,524,529 | A | 6/1985 | Schaefer |
| 4,546,559 | A | 10/1985 | Dassler et al. |
| 4,624,062 | A | 11/1986 | Autry |
| 4,642,911 | A | 2/1987 | Talarico et al. |
| 4,658,515 | A | 4/1987 | Oatman et al. |
| 4,667,423 | A | 5/1987 | Autry et al. |
| D296,262 | S | 6/1988 | Brown et al. |
| 4,754,561 | A | 7/1988 | Dufour |
| D302,898 | S | 8/1989 | Greenberg |
| RE33,066 | E | 9/1989 | Stubblefield |
| 4,864,739 | A | 9/1989 | Maestri |
| 4,922,631 | A | 5/1990 | Anderie |
| 4,970,807 | A | 11/1990 | Anderie et al. |
| 4,980,445 | A | 12/1990 | van Der wal et al. |
| 5,025,573 | A | 6/1991 | Giese et al. |
| D329,731 | S | 9/1992 | Adcock et al. |
| 5,150,490 | A | 9/1992 | Busch et al. |
| D333,556 | S | 3/1993 | Purdom |

(Continued)

FOREIGN PATENT DOCUMENTS

| | | | |
|---|---|---|---|
| BR | 102013002759 | A2 | 10/2015 |
| BR | 9102933 | U2 | 5/2017 |

(Continued)

OTHER PUBLICATIONS

Machine Translation of DE102013012625A1. Feb. 5, 2015 (Year: 2015).*
Okorokov, I. Shoes Report. https://shoes-report.com/articles/aktsenty/obuvnoy-likbez-iz-chego-delayutsya-obuvnye-podoshvy/#:~:text=PVC%20soles%20are%20most%20often,both%20options%20can%20be%20applied. Apr. 10, 2014. (Year: 2014).*
Office Action, Chinese Patent Application No. 202010081274.3, Feb. 26, 2021, 19 pages.
Office Action, Chinese Patent Application No. 202010081297.4, Mar. 19, 2021, 16 pages.
U.S. Appl. No. 16/139,797, Advisory Action, Nov. 10, 2020, 5 pages.

(Continued)

*Primary Examiner* — Stephen E Rieth
(74) *Attorney, Agent, or Firm* — Kilpatrick Townsend & Stockton LLP

(57) ABSTRACT

A sports shoe includes an upper wherein a majority by weight of the upper is made from a thermoplastic base material and a sole wherein a majority by weight of the sole is made from the same thermoplastic base material. The sole and the upper are individually fabricated and joined to each other. The thermoplastic base material includes at least one of the following materials: thermoplastic polyurethane TPU, polyamide PA, polyethylene terephthalate PET, or polybutylene terephthalate PBT.

11 Claims, 1 Drawing Sheet

(56) References Cited

U.S. PATENT DOCUMENTS

| | | | |
|---|---|---|---|
| D337,650 | S | 7/1993 | Thomas, III et al. |
| D340,797 | S | 11/1993 | Pallera et al. |
| 5,283,963 | A | 2/1994 | Lerner et al. |
| 5,308,420 | A | 5/1994 | Yang et al. |
| 5,319,866 | A | 6/1994 | Foley et al. |
| D350,016 | S | 8/1994 | Passke et al. |
| D350,222 | S | 9/1994 | Hase |
| 5,381,607 | A | 1/1995 | Sussmann |
| D356,438 | S | 3/1995 | Opie et al. |
| 5,549,743 | A | 8/1996 | Pearce |
| D375,619 | S | 11/1996 | Backus et al. |
| 5,617,650 | A | 4/1997 | Grim |
| 5,692,319 | A | 12/1997 | Parker et al. |
| 5,709,954 | A | 1/1998 | Lyden et al. |
| D389,991 | S | 2/1998 | Elliott |
| D390,349 | S | 2/1998 | Murai et al. |
| D393,340 | S | 4/1998 | Doxey |
| 5,743,027 | A | 4/1998 | Barma |
| D395,337 | S | 6/1998 | Greene |
| D408,618 | S | 4/1999 | Wilborn et al. |
| D408,971 | S | 5/1999 | Birkenstock |
| D413,010 | S | 8/1999 | Birkenstock |
| 5,932,336 | A | 8/1999 | Petrovic et al. |
| D414,920 | S | 10/1999 | Cahill |
| D415,610 | S | 10/1999 | Cahill |
| D415,876 | S | 11/1999 | Cahill |
| 5,996,252 | A | 12/1999 | Cougar |
| 6,014,821 | A | 1/2000 | Yaw |
| 6,029,376 | A | 2/2000 | Cass |
| 6,041,521 | A | 3/2000 | Wong |
| D422,400 | S | 4/2000 | Brady et al. |
| D423,199 | S | 4/2000 | Cahill |
| 6,108,943 | A | 8/2000 | Hudson |
| D431,346 | S | 10/2000 | Birkenstock |
| 6,237,251 | B1 | 5/2001 | Litchfield et al. |
| D460,852 | S | 7/2002 | Daudier |
| 6,516,540 | B2 | 2/2003 | Seydel et al. |
| 6,702,469 | B1 | 3/2004 | Taniguchi et al. |
| D490,222 | S | 5/2004 | Burg et al. |
| D490,230 | S | 5/2004 | Mervar |
| D492,099 | S | 6/2004 | McClaskie |
| 6,782,640 | B2 | 8/2004 | West et al. |
| 6,796,056 | B2 | 9/2004 | Swigart |
| D498,901 | S | 11/2004 | Hawker et al. |
| 6,849,667 | B2 | 2/2005 | Haseyama et al. |
| 6,874,257 | B2 | 4/2005 | Erickson |
| 6,910,288 | B2 | 6/2005 | Dua |
| 6,925,734 | B1 | 8/2005 | Schaeffer et al. |
| 6,948,263 | B2 | 9/2005 | Covatch |
| 6,957,504 | B2 | 10/2005 | Morris |
| D517,302 | S | 3/2006 | Ardissono |
| 7,073,277 | B2 | 7/2006 | Erb et al. |
| 7,086,179 | B2 | 8/2006 | Dojan et al. |
| 7,143,529 | B2 | 12/2006 | Robinson et al. |
| D538,518 | S | 3/2007 | Della Valle |
| 7,202,284 | B1 | 4/2007 | Limerkens et al. |
| D554,848 | S | 11/2007 | Marston |
| D560,883 | S | 2/2008 | McClaskie |
| D561,433 | S | 2/2008 | McClaskie |
| D561,438 | S | 2/2008 | Belley |
| D561,986 | S | 2/2008 | Horne et al. |
| D570,581 | S | 6/2008 | Moretti |
| D571,085 | S | 6/2008 | McClaskie |
| D572,462 | S | 7/2008 | Hatfield et al. |
| 7,421,805 | B2 | 9/2008 | Geer |
| D586,090 | S | 2/2009 | Turner et al. |
| D589,690 | S | 4/2009 | Truelsen |
| D594,187 | S | 6/2009 | Hickman |
| D596,384 | S | 7/2009 | Andersen et al. |
| D601,333 | S | 10/2009 | McClaskie |
| D606,733 | S | 12/2009 | McClaskie |
| D607,190 | S | 1/2010 | McClaskie |
| D611,233 | S | 3/2010 | Della Valle et al. |
| 7,673,397 | B2 | 3/2010 | Jarvis |
| D616,183 | S | 5/2010 | Skaja |
| D617,540 | S | 6/2010 | McClaskie |
| D618,891 | S | 7/2010 | McClaskie |
| D631,646 | S | 2/2011 | Müller |
| D633,286 | S | 3/2011 | Skaja |
| D633,287 | S | 3/2011 | Skaja |
| D634,918 | S | 3/2011 | Katz et al. |
| D636,156 | S | 4/2011 | Della Valle et al. |
| D636,569 | S | 4/2011 | McMillan |
| D636,571 | S | 4/2011 | Avar |
| 7,941,941 | B2 | 5/2011 | Hazenberg et al. |
| D641,142 | S | 7/2011 | Lindseth et al. |
| D644,827 | S | 9/2011 | Lee |
| D645,649 | S | 9/2011 | McClaskie |
| D648,105 | S | 11/2011 | Schlageter et al. |
| D650,159 | S | 12/2011 | Avar |
| 8,082,684 | B2 | 12/2011 | Munns |
| D655,488 | S | 3/2012 | Blakeslee |
| D659,364 | S | 5/2012 | Jolicoeur |
| 8,186,081 | B2 | 5/2012 | Wilson, III |
| D680,725 | S | 4/2013 | Avar et al. |
| D680,726 | S | 4/2013 | Propét |
| D683,116 | S | 5/2013 | Petrie |
| 8,438,757 | B2 | 5/2013 | Roser |
| 8,479,412 | B2 | 7/2013 | Peyton et al. |
| 8,490,297 | B2 | 7/2013 | Guerra |
| D693,553 | S | 11/2013 | McClaskie |
| D695,501 | S | 12/2013 | Yehudah |
| D698,137 | S | 1/2014 | Carr |
| D707,934 | S | 7/2014 | Petrie |
| D709,680 | S | 7/2014 | Herath |
| 8,834,770 | B2 | 9/2014 | Nakano et al. |
| D721,478 | S | 1/2015 | Avent et al. |
| 9,010,157 | B1 | 4/2015 | Podhajny et al. |
| D739,129 | S | 9/2015 | Del Biondi |
| D739,131 | S | 9/2015 | Del Biondi |
| 9,132,430 | B2 † | 9/2015 | Lofts |
| D740,003 | S | 10/2015 | Herath |
| D740,004 | S | 10/2015 | Hoellmueller et al. |
| 9,212,270 | B2 | 12/2015 | Künkel et al. |
| D758,056 | S | 6/2016 | Herath et al. |
| D776,410 | S | 1/2017 | Herath et al. |
| D783,264 | S | 4/2017 | Hoellmueller et al. |
| 9,610,746 | B2 | 4/2017 | Wardlaw et al. |
| 9,713,357 | B2 | 7/2017 | Denison |
| 9,737,114 | B2 | 8/2017 | Beye et al. |
| 9,781,970 | B2 | 10/2017 | Angus et al. |
| 9,781,974 | B2 | 10/2017 | Reinhardt |
| 9,788,598 | B2 | 10/2017 | Reinhardt |
| 9,788,606 | B2 | 10/2017 | Reinhardt |
| 9,820,528 | B2 | 11/2017 | Reinhardt et al. |
| 9,833,039 | B2 | 12/2017 | Smaldone et al. |
| 9,849,645 | B2 | 12/2017 | Wardlaw et al. |
| 10,259,183 | B2 | 4/2019 | Wardlaw et al. |
| 2003/0131501 | A1 | 7/2003 | Erickson et al. |
| 2003/0158275 | A1 | 8/2003 | McClelland et al. |
| 2003/0172548 | A1 * | 9/2003 | Fuerst .................. A43B 13/026 36/28 |
| 2003/0208925 | A1 | 11/2003 | Pan |
| 2004/0032042 | A1 | 2/2004 | Chi |
| 2004/0087230 | A1 † | 5/2004 | Wildeman |
| 2004/0138318 | A1 | 7/2004 | McClelland et al. |
| 2004/0211088 | A1 | 10/2004 | Volkart |
| 2005/0065270 | A1 | 3/2005 | Knoerr et al. |
| 2005/0108898 | A1 | 5/2005 | Jeppesen et al. |
| 2005/0150132 | A1 | 7/2005 | Iannacone |
| 2005/0241181 | A1 | 11/2005 | Cheng |
| 2006/0010717 | A1 | 1/2006 | Finkelstein et al. |
| 2006/0026863 | A1 | 2/2006 | Liu |
| 2006/0083912 | A1 | 4/2006 | Park et al. |
| 2006/0125134 | A1 | 6/2006 | Lin et al. |
| 2006/0134351 | A1 | 6/2006 | Greene et al. |
| 2006/0156579 | A1 | 7/2006 | Hoffer et al. |
| 2006/0235095 | A1 | 10/2006 | Leberfinger et al. |
| 2006/0283046 | A1 | 12/2006 | Mason |
| 2007/0193070 | A1 | 8/2007 | Bertagna et al. |
| 2007/0199213 | A1 | 8/2007 | Campbell et al. |
| 2007/0271821 | A1 | 11/2007 | Meschter |
| 2007/0295451 | A1 | 12/2007 | Willis |
| 2007/0296115 | A1 | 12/2007 | Truelsen |

(56) References Cited

U.S. PATENT DOCUMENTS

2008/0005856 A1 1/2008 Hung
2008/0052965 A1 3/2008 Sato et al.
2008/0060221 A1 3/2008 Hottinger et al.
2008/0244932 A1 10/2008 Nau et al.
2008/0250666 A1 10/2008 Votolato
2009/0013558 A1 1/2009 Hazenberg et al.
2009/0025260 A1 1/2009 Nakano
2009/0113758 A1 5/2009 Nishiwaki et al.
2009/0119023 A1 5/2009 Zimmer et al.
2009/0235557 A1 9/2009 Christensen et al.
2009/0277047 A1 11/2009 Moretti
2009/0320330 A1 12/2009 Borel et al.
2010/0005602 A1 1/2010 Wu
2010/0063778 A1 3/2010 Schrock et al.
2010/0102468 A1 4/2010 Chen
2010/0122472 A1 5/2010 Wilson, III et al.
2010/0154257 A1 6/2010 Bosomworth et al.
2010/0199520 A1 8/2010 Dua et al.
2010/0218397 A1 9/2010 Nishiwaki et al.
2010/0222442 A1 9/2010 Prissok et al.
2010/0242309 A1 9/2010 McCann
2010/0287788 A1 11/2010 Spanks et al.
2010/0287795 A1 11/2010 Van Niekerk
2010/0293811 A1 11/2010 Truelsen
2010/0293814 A1 11/2010 Skaja et al.
2010/0325921 A1 12/2010 Wu
2011/0047720 A1 3/2011 Maranan et al.
2011/0067272 A1 3/2011 Lin
2011/0124258 A1 5/2011 White et al.
2011/0138652 A1 6/2011 Lucas et al.
2011/0232135 A1 9/2011 Dean et al.
2011/0252668 A1 10/2011 Chen
2011/0283560 A1 11/2011 Portzline et al.
2011/0302805 A1 12/2011 Vito
2012/0005920 A1 1/2012 Alvear et al.
2012/0047770 A1 3/2012 Dean et al.
2012/0059075 A1 3/2012 Prissok et al.
2012/0060389 A1 3/2012 Mille
2012/0144698 A1 6/2012 McDowell
2012/0144702 A1 6/2012 Wu
2012/0177777 A1 7/2012 Brown et al.
2012/0233877 A1 9/2012 Swigart
2012/0233883 A1 9/2012 Spencer et al.
2012/0235322 A1 9/2012 Greene et al.
2012/0266490 A1 10/2012 Atwal et al.
2013/0150468 A1 6/2013 Füssi et al.
2013/0232815 A1 9/2013 Meythaler et al.
2013/0255103 A1* 10/2013 Dua .................... A43B 23/025 428/57
2013/0266792 A1 10/2013 Nohara et al.
2013/0269215 A1 10/2013 Smirman et al.
2013/0291409 A1 11/2013 Reinhardt et al.
2013/0312284 A1 11/2013 Berend et al.
2014/0017450 A1 1/2014 Baghdadi et al.
2014/0026438 A1 1/2014 Cortez et al.
2014/0033573 A1 2/2014 Wills
2014/0066530 A1 3/2014 Shen et al.
2014/0075787 A1 3/2014 Cartagena
2014/0137965 A1 5/2014 Truitt et al.
2014/0197253 A1 7/2014 Lofts et al.
2014/0215851 A1 8/2014 Solsona et al.
2014/0223673 A1 8/2014 Wardlaw et al.
2014/0223776 A1 8/2014 Wardlaw et al.
2014/0223777 A1* 8/2014 Whiteman ........... A43B 13/181 36/102
2014/0223783 A1 8/2014 Wardlaw et al.
2014/0227505 A1 8/2014 Schiller et al.
2014/0237858 A1 8/2014 Adami
2014/0239878 A1 8/2014 Yun et al.
2014/0283410 A1 9/2014 Marvin
2014/0310986 A1* 10/2014 Tamm ................ A43B 23/0245 12/142 T
2014/0366403 A1 12/2014 Reinhardt et al.
2014/0366404 A1* 12/2014 Reinhardt ............ A43B 1/0009 36/30 R
2014/0366405 A1 12/2014 Reinhardt et al.
2014/0373392 A1 12/2014 Cullen
2015/0082668 A1 3/2015 Nakaya et al.
2015/0089841 A1 4/2015 Smaldone et al.
2015/0143716 A1 5/2015 Long et al.
2015/0166270 A1 6/2015 Buscher et al.
2015/0174808 A1 6/2015 Rudolph et al.
2015/0197617 A1 7/2015 Prissok et al.
2015/0201707 A1 7/2015 Bruce
2015/0223552 A1 8/2015 Love et al.
2015/0237823 A1 8/2015 Schmitt et al.
2015/0344661 A1 12/2015 Spies et al.
2015/0351493 A1 12/2015 Ashcroft et al.
2016/0037859 A1 2/2016 Smith et al.
2016/0044992 A1 2/2016 Reinhardt et al.
2016/0046751 A1 2/2016 Spies et al.
2016/0081418 A1* 3/2016 Amos .................. G01C 22/006 36/43
2016/0093199 A1 3/2016 Whitney et al.
2016/0095377 A1 4/2016 Tamm
2016/0121524 A1 5/2016 Däschlein et al.
2016/0128426 A1 5/2016 Reinhardt et al.
2016/0227876 A1 8/2016 Le et al.
2016/0244583 A1 8/2016 Keppeler
2016/0244584 A1 8/2016 Keppeler
2016/0244587 A1 8/2016 Gutmann et al.
2016/0278481 A1 9/2016 Le et al.
2016/0295955 A1 10/2016 Wardlaw et al.
2016/0302508 A1* 10/2016 Kormann ............... G06Q 50/04
2016/0346627 A1 12/2016 Le et al.
2017/0015825 A1 1/2017 Ting et al.
2017/0119102 A1 5/2017 McDowell
2017/0173910 A1 6/2017 Wardlaw et al.
2017/0253710 A1 9/2017 Smith et al.
2017/0259474 A1 9/2017 Holmes et al.
2017/0340067 A1 11/2017 Dyckmans et al.
2017/0341325 A1 11/2017 Le et al.
2017/0341326 A1 11/2017 Holmes et al.
2017/0341327 A1 11/2017 Le et al.
2018/0000197 A1 1/2018 Wardlaw et al.
2018/0035755 A1 2/2018 Reinhardt et al.
2018/0110293 A1 4/2018 Lebo
2018/0154598 A1 6/2018 Kurtz et al.
2018/0206591 A1 7/2018 Whiteman et al.
2018/0235310 A1 8/2018 Wardlaw et al.
2018/0290349 A1 10/2018 Kirupanantham et al.
2018/0303198 A1 10/2018 Reinhardt et al.
2019/0021435 A1 1/2019 Kormann et al.
2019/0193336 A1 6/2019 Sybert et al.
2019/0200699 A1 7/2019 Ghiotti
2019/0291371 A1 9/2019 Wardlaw et al.
2020/0221820 A1 7/2020 Le et al.
2020/0230905 A1 7/2020 Le et al.
2020/0253328 A1 8/2020 Reinhardt et al.
2020/0315290 A1 10/2020 Reinhardt et al.
2020/0329809 A1 10/2020 Whiteman et al.
2020/0329812 A1 10/2020 Le et al.
2020/0391417 A1 12/2020 Smith

FOREIGN PATENT DOCUMENTS

BR 102016025941 A2 5/2018
CA 3083860 A1 6/2019
CN 1034662 8/1989
CN 1036128 10/1989
CN 1215424 A 4/1999
CN 2511160 9/2002
CN 1646280 A 7/2005
CN 2796454 7/2006
CN 2888936 4/2007
CN 101107113 1/2008
CN 101190049 6/2008
CN 201223028 4/2009
CN 101484035 7/2009
CN 101489683 A 7/2009
CN 101611950 12/2009
CN 202233324 5/2012
CN 102578759 A 7/2012
CN 202635746 1/2013

(56) References Cited

FOREIGN PATENT DOCUMENTS

| | | | | | |
|---|---|---|---|---|---|
| CN | 102950671 | A | | 3/2013 | |
| CN | 202907958 | | | 5/2013 | |
| CN | 103371564 | | | 10/2013 | |
| CN | 203692653 | | | 7/2014 | |
| CN | 203828180 | | | 9/2014 | |
| CN | 104106882 | A | | 10/2014 | |
| CN | 104290217 | A | | 1/2015 | |
| CN | 109111550 | A | | 1/2019 | |
| DE | 3605662 | | | 6/1987 | |
| DE | 4236081 | | | 4/1994 | |
| DE | 29718491 | | | 2/1998 | |
| DE | 19652690 | | | 6/1998 | |
| DE | 19950121 | | | 11/2000 | |
| DE | 10010182 | | | 9/2001 | |
| DE | 10244433 | | | 12/2005 | |
| DE | 10244435 | | | 2/2006 | |
| DE | 102004063803 | | | 7/2006 | |
| DE | 102005050411 | | | 4/2007 | |
| DE | 202008017042 | | | 4/2009 | |
| DE | 102008020890 | | | 10/2009 | |
| DE | 102009004386 | | | 7/2010 | |
| DE | 202010008893 | | | 1/2011 | |
| DE | 202010015777 | | | 1/2011 | |
| DE | 112009001291 | | | 4/2011 | |
| DE | 102010052783 | | | 5/2012 | |
| DE | 202012005735 | | | 8/2012 | |
| DE | 102011108744 | | | 1/2013 | |
| DE | 102012206094 | | | 10/2013 | |
| DE | 102013202291 | A1 | | 8/2014 | |
| DE | 102013202353 | | | 8/2014 | |
| DE | 102013202353 | A1 | | 8/2014 | |
| DE | 102013208170 | | | 11/2014 | |
| DE | 102013012625 | A1 | * | 2/2015 | ............ C08G 18/10 |
| EM | 001286116-0001 | | | 7/2011 | |
| EM | 001286116-0002 | | | 7/2011 | |
| EM | 001286116-0003 | | | 7/2011 | |
| EM | 001286116-0004 | | | 7/2011 | |
| EM | 001286116-0005 | | | 7/2011 | |
| EM | 001286116-0006 | | | 7/2011 | |
| EP | 0165353 | | | 12/1985 | |
| EP | 752216 | | | 1/1997 | |
| EP | 873061 | | | 10/1998 | |
| EP | 1197159 | | | 4/2002 | |
| EP | 1424105 | | | 6/2004 | |
| EP | 1541048 | A1 | † | 6/2005 | |
| EP | 1854620 | | | 11/2007 | |
| EP | 1872924 | | | 1/2008 | |
| EP | 2110037 | A1 | | 10/2009 | |
| EP | 2233021 | | | 9/2010 | |
| EP | 2250917 | | | 11/2010 | |
| EP | 2316293 | | | 5/2011 | |
| EP | 2342986 | | | 7/2011 | |
| EP | 2446768 | | | 5/2012 | |
| EP | 2649896 | | | 10/2013 | |
| EP | 2649896 | A2 | † | 10/2013 | |
| EP | 2649898 | A1 | | 10/2013 | |
| EP | 2540184 | B1 | | 7/2014 | |
| EP | 2792261 | A1 | | 10/2014 | |
| EP | 2848144 | | | 3/2015 | |
| EP | 2939558 | | | 11/2015 | |
| EP | 3067100 | | | 9/2016 | |
| EP | 3081109 | B1 | | 1/2019 | |
| EP | 3590998 | A1 | | 1/2020 | |
| EP | 3922665 | A1 | † | 12/2021 | |
| ES | 1073997 | | | 6/2011 | |
| FR | 2683432 | | | 5/1993 | |
| FR | 2958835 | A3 | † | 10/2011 | |
| GB | 1172210 | A | | 11/1969 | |
| GB | 2258801 | | | 2/1993 | |
| JP | 01274705 | | | 11/1989 | |
| JP | 04502780 | | | 5/1992 | |
| JP | 6046483 | U | | 6/1994 | |
| JP | H07-24437 | A | | 1/1995 | |
| JP | 10152575 | A | | 11/1996 | |
| JP | H08-323890 | A | | 12/1996 | |
| JP | H09-150467 | A | | 6/1997 | |
| JP | H10-128305 | A | | 5/1998 | |
| JP | 2000197503 | | | 7/2000 | |
| JP | 2002-272506 | A | | 9/2002 | |
| JP | 2002-283473 | A | | 10/2002 | |
| JP | 2002-301778 | A | | 10/2002 | |
| JP | 2002361749 | | | 12/2002 | |
| JP | 2003-135105 | A | | 5/2003 | |
| JP | 2003-145610 | A | | 5/2003 | |
| JP | 2005218543 | | | 8/2005 | |
| JP | 2006-192723 | A | | 7/2006 | |
| JP | 2006-192750 | A | † | 7/2006 | |
| JP | 2007-504295 | A | | 3/2007 | |
| JP | 2007516109 | | | 6/2007 | |
| JP | 2008073548 | | | 4/2008 | |
| JP | 2008543401 | | | 12/2008 | |
| JP | 4920138 | B2 | | 2/2012 | |
| JP | 2012-062615 | A | | 3/2012 | |
| JP | 2012-512698 | A | | 6/2012 | |
| JP | 2014-210179 | A | | 11/2014 | |
| KR | 20080065393 | A | | 7/2008 | |
| KR | 1020110049293 | | | 5/2011 | |
| TW | 445138 | B | | 7/2001 | |
| TW | 200917985 | A | | 5/2009 | |
| TW | 201012407 | | | 4/2010 | |
| WO | 8906501 | | | 7/1989 | |
| WO | 1994020568 | A1 | | 9/1994 | |
| WO | 2002/000432 | A1 | | 1/2002 | |
| WO | 2002/008322 | | | 1/2002 | |
| WO | 2003/030795 | A2 | | 4/2003 | |
| WO | 2003/076170 | A1 | | 9/2003 | |
| WO | 2005023920 | | | 3/2005 | |
| WO | 2005026243 | A1 | | 3/2005 | |
| WO | 2005038706 | | | 4/2005 | |
| WO | 2005066250 | | | 7/2005 | |
| WO | 2006015440 | | | 2/2006 | |
| WO | 2006027671 | | | 3/2006 | |
| WO | 2006/034807 | A1 | | 4/2006 | |
| WO | 2006090221 | | | 8/2006 | |
| WO | 2007082838 | | | 7/2007 | |
| WO | 2008047538 | A1 | | 4/2008 | |
| WO | 2008087078 | | | 7/2008 | |
| WO | 2009039555 | | | 4/2009 | |
| WO | 2009095935 | | | 8/2009 | |
| WO | 2010010010 | | | 1/2010 | |
| WO | 2010037028 | | | 4/2010 | |
| WO | 2010045144 | | | 4/2010 | |
| WO | 2010/080182 | A1 | | 7/2010 | |
| WO | 2010/090923 | A2 | | 8/2010 | |
| WO | 2010/120955 | A1 | | 10/2010 | |
| WO | 2010136398 | | | 12/2010 | |
| WO | 2011/035236 | A2 | | 3/2011 | |
| WO | 2011134996 | A1 | | 11/2011 | |
| WO | 2012065926 | | | 5/2012 | |
| WO | 2013013784 | | | 1/2013 | |
| WO | 2013151987 | A2 | † | 10/2013 | |
| WO | 2013/169351 | A2 | | 11/2013 | |
| WO | 2013168256 | | | 11/2013 | |
| WO | 2014046940 | | | 3/2014 | |
| WO | 2014120349 | A1 | † | 8/2014 | |
| WO | 2015052265 | A1 | | 4/2015 | |
| WO | 2015052267 | A1 | | 4/2015 | |
| WO | 2015075546 | A1 | | 5/2015 | |
| WO | 2018/209005 | A1 | | 11/2018 | |
| WO | 2021/155892 | A1 | | 8/2021 | |

OTHER PUBLICATIONS

U.S. Appl. No. 16/139,797, Final Office Action, Aug. 10, 2020, 17 pages.

U.S. Appl. No. 16/139,797, Non-Final Office Action, Jan. 28, 2020, 23 pages.

U.S. Appl. No. 16/139,797, Notice of Allowance, Jan. 28, 2021, 12 pages.

U.S. Appl. No. 16/139,797, Supplemental Notice of Allowability, Feb. 12, 2021, 2 pages.

Office Action, Chinese Patent Application No. 202010081274.3, Sep. 14, 2021, 15 pages.

(56) References Cited

OTHER PUBLICATIONS

Office Action, Chinese Patent Application No. 202010081297.4, Sep. 2, 2021, 16 pages.
Office Action, German Patent Application No. 102015206900.1, Feb. 13, 2023, 11 pages.
Decision of Rejection, Chinese Patent Application No. 202010081297.4, Apr. 12, 2022, 22 pages.
Office Action, Chinese Patent Application No. 202010081274.3, May 16, 2022, 6 pages.
Office Action, Japanese Patent Application No. 2016-084549, Jun. 1, 2021, 7 pages.
Office Action, European Patent Application No. 19150407.5, Apr. 22, 2021, 6 pages.
Decision of Rejection, Chinese Patent Application No. 202010081274.3, Jan. 7, 2022, 16 pages.
Office Action, Chinese Patent Application No. 202010081297.4, Feb. 7, 2022, 29 pages.
Third Party Submission, U.S. Appl. No. 17/178,838, Oct. 20, 2022, 9 pages.
Third Party Submission, U.S. Appl. No. 17/178,838, Oct. 27, 2022, 45 pages.
Grounds for Decision on Opposition, European Application No. 16165059.3, Jun. 3, 2022, 21 pages.
Minutes from Oral Proceedings, European Patent Application No. 16165059.3, Jun. 3, 2022, 2 pages.
Reply to Notice of Opposition, European Patent Application No. 16165059.3, Jun. 2, 2020, 83 pages.
Statement on Grounds for Appeal (adidas AG), European Patent Application No. 16165059.3, Oct. 7, 2022, 27 pages.
Transmittal on Decision on Opposition, European Patent Application No. 16165059.3, Apr. 15, 2021, 49 pages.
Statement on Grounds for Appeal (On Clouds GmbH), European Patent Application No. 16165059.3, Oct. 11, 2022, 35 pages.
Written Submission for Oral Proceedings, European Patent Application No. 16165059.3, Sep. 24, 2021, 92 pages.
"Thermoplastic Polyurethane Elastomers (TPU)", Elastollan®—Material Properties, BASF, Feb. 2005, 43 pages.
Wikipedia—Monofil (Monofilament), https://de.wikipedia.org/w/index.php?title=Monofil&oldid=140642567, Apr. 7, 2015, 3 pages.
Wikipedia—Polyurethane, https://de.wikipedia.org/w/index.php?title=Polyurethane&oldid=140230836, Mar. 24, 2015, 14 pages.
Wikipedia, Garn (Yarn), https://de.wikipedia.org/w/index.php?title=Garn&oldid=139614741 1/, Mar. 9, 2015, Mar. 9, 2015.
Wikipedia, Vliesstoff (Nonwovens), https://de.wikipedia.org/w/index.php?title=Vliesstoff&oldid=140680573, Apr. 8, 2015, 44 pages.
Arenz , "Elastollan®—TPU", Thermoplastic Polyurethanes of Elastogran, Apr. 2009, 37 pages.
Kim et al., "Improving Shoe Performance and Increasing Automation in Footwear Production with New TPU Foam", TPE Magazine, 2015, 5 pages.
Nähgarn , www.Kurzwarenland.de/Naehlexikon/Naehgarn, Mar. 30, 2015, 3 pages.
Perret , "From Castor Oil to Specialty Polyamides: The Success of the Diversification", Oct. 2014, 32 pages.
Sonnenschein , "Polyurethanes Science, Technology, Markets and Trends", 2015, 444 pages.
U.S. Appl. No. 15/130,012, filed Apr. 15, 2016, Kormann et al.
German Patent Application No. 102015206900.1, Office Action, mailed Feb. 8, 2016, 7 pages (No English translation available. A summary of the Office Action is provided in the Transmittal Letter submitted herewith).
Amesoder et al., The right turn (part 1)—Determination of Characteristic values for assembly injection molding, Journal of Plastics Technology, Apr. 2008, pp. 1-8 (English translation of Abstract provided).
Baur et al., Saechtling Kunststoff Taschenbuc, Hanser Verlag, 31 Ausgabe, Oct. 2013, 18 pages.
Venable LLP, Letter, dated Jan. 14, 2016, 6 pages.
European Search Report, European Patent Application No. 16165059.3, mailed Sep. 20, 2016, 7 pgs.
"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.
"http://www.dow.com/polyethylene/na/en/fab/foaming.htm", Dec. 7, 2011, 1 page.
Nauta , "Stabilisation of Low Density, Closed Cell Polyethylene Foam", University of Twente, Netherlands, 2000, 148 pages.
Third Party Submission, U.S. Appl. No. 14/981,168, Nov. 14, 2016, 44 pages.
U.S. Appl. No. 15/703,031, Unpublished (filed Sep. 13, 2017).
U.S. Appl. No. 15/724,318, Unpublished (filed Oct. 4, 2017).
U.S. Appl. No. 15/581,112, Unpublished (filed Apr. 28, 2017).
U.S. Appl. No. 29/591,016, Unpublished (filed Jan. 16, 2017).
U.S. Appl. No. 29/592,935, Unpublished (filed Feb. 3, 2017).
U.S. Appl. No. 29/592,946, Unpublished (filed Feb. 3, 2017).
U.S. Appl. No. 29/594,228, Unpublished (filed Feb. 16, 2017).
U.S. Appl. No. 29/594,358, Unpublished (filed Feb. 17, 2017).
U.S. Appl. No. 29/595,852, Unpublished (filed Mar. 2, 2017).
U.S. Appl. No. 29/595,857, Unpublished (filed Mar. 2, 2017).
U.S. Appl. No. 29/595,859, Unpublished (filed Mar. 2, 2017).
U.S. Appl. No. 29/614,532, Unpublished (filed Aug. 21, 2017).
U.S. Appl. No. 29/614,545, Unpublished (filed Aug. 21, 2017).
Azo Materials , ""BASF Develops Expanded Thermoplastic Polyurethane", available http://www.azom.com/news.aspxNewsID=37360", Jul. 2, 2013, 4 pages.
Office Action , Chinese Application No. 201610232841.4, mailed Jun. 19, 2017.
U.S. Appl. No. 62/137,139, filed Mar. 23, 2015, Unpublished.
U.S. Appl. No. 29/664,097, filed Sep. 21, 2018, Unpublished.
U.S. Appl. No. 16/680,852, filed Nov. 12, 2019, Unpublished.
U.S. Appl. No. 29/663,342, filed Sep. 13, 2018, Unpublished.
U.S. Appl. No. 29/691,166, filed May 14, 2019, Unpublished.
U.S. Appl. No. 29/643,233, filed Apr. 5, 2018 , Unpublished.
U.S. Appl. No. 29/641,371, filed Mar. 21, 2018, Unpublished.
U.S. Appl. No. 29/663,029, filed Sep. 11, 2018, Unpublished.
U.S. Appl. No. 29/641,256, filed Mar. 20, 2018, Unpublished.
U.S. Appl. No. 29/641,223, filed Mar. 20, 2018, Unpublished.
U.S. Appl. No. 29/697,489, filed Jul. 9, 2019, Unpublished.
U.S. Appl. No. 29/691,854, filed May 20, 2019, Unpublished.
U.S. Appl. No. 29/694,634, filed Jun. 12, 2019, Unpublished.
U.S. Appl. No. 29/719,889, filed Jan. 8, 2020, Unpublished.
U.S. Appl. No. 29/679,962, filed Feb. 12, 2019, Unpublished.
U.S. Appl. No. 29/693,455, filed Jun. 3, 2019, Unpublished.
U.S. Appl. No. 16/465,485, filed May 30, 2019, Unpublished.
U.S. Appl. No. 29/706,274, filed Sep. 19, 2019, Unpublished.
U.S. Appl. No. 29/721,029, filed Jan. 17, 2020, Unpublished.
European Extended Search Report, European Patent Application No. 19150407.5, Apr. 9, 2019, 9 pages.
U.S. Appl. No. 15/130,012, Advisory Action, Aug. 29, 2018, 7 pages.
U.S. Appl. No. 15/130,012 , Final Office Action, May 24, 2018, 26 pages.
U.S. Appl. No. 15/130,012 , Non-Final Office Action, Jan. 26, 2018, 18 pages.
U.S. Appl. No. 15/130,012 , Restriction Requirement, Oct. 13, 2017, 10 pages.
Office Action, Chinese Patent Application No. 201610232841.4, Jun. 19, 2017, 17 pages.
Office Action, Japanese Patent Application No. 2016-078622, May 8, 2018, 8 pages.
Office Action, Japanese Patent Application No. 2016-078622, Jan. 22, 2019, 6 pages.
Office Action, Japanese Patent Application No. 2016-078622, Jul. 16, 2019, 6 pages.
Notice of Opposition, European Patent Application No. 16165059.3, mailed Oct. 9, 2019, 44 pages.
Wikipedia, Thermoplastic Polyurethane, 4 pages, Admitted Prior Art.
Office Action, German Patent Application No. 102015206900.1, mailed Apr. 23, 2019, 12 pages.
Office Action, Japanese Patent Application No. 2016-084549, Jul. 21, 2020, 8 pages.

(56) References Cited

OTHER PUBLICATIONS

Office Action, Japanese Patent Application No. 2016-078622, Nov. 24, 2020, 11 pages.
U.S. Appl. No. 29/760,713, filed Dec. 3, 2020, Unpublished.
U.S. Appl. No. 17/154,481, filed Jan. 21, 2021, Unpublished.
U.S. Appl. No. 29/730,512, filed Apr. 6, 2020, Unpublished.
U.S. Appl. No. 16/918,241, filed Jul. 1, 2020, Unpublished.
European Extended Search Report, European Patent Application No. 23189175.5, Nov. 8, 2023, 9 pages.
Decision of Reexamination, Chinese Patent Application No. 202010081297.4, Nov. 28, 2024, 16 pages.
Notification of Reexamination, Chinese Patent Application No. 202010081297.4, Oct. 18, 2024, 16 pages.

* cited by examiner
† cited by third party

FIG 1
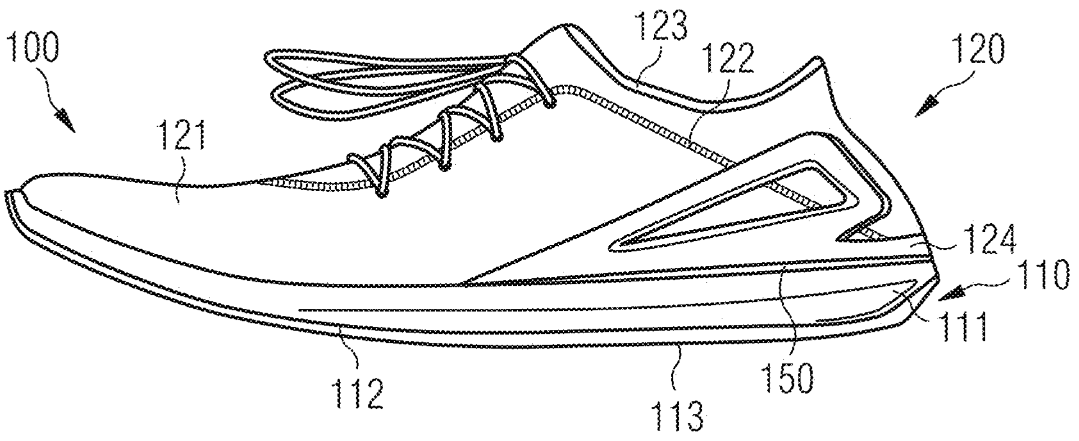
FIG 2
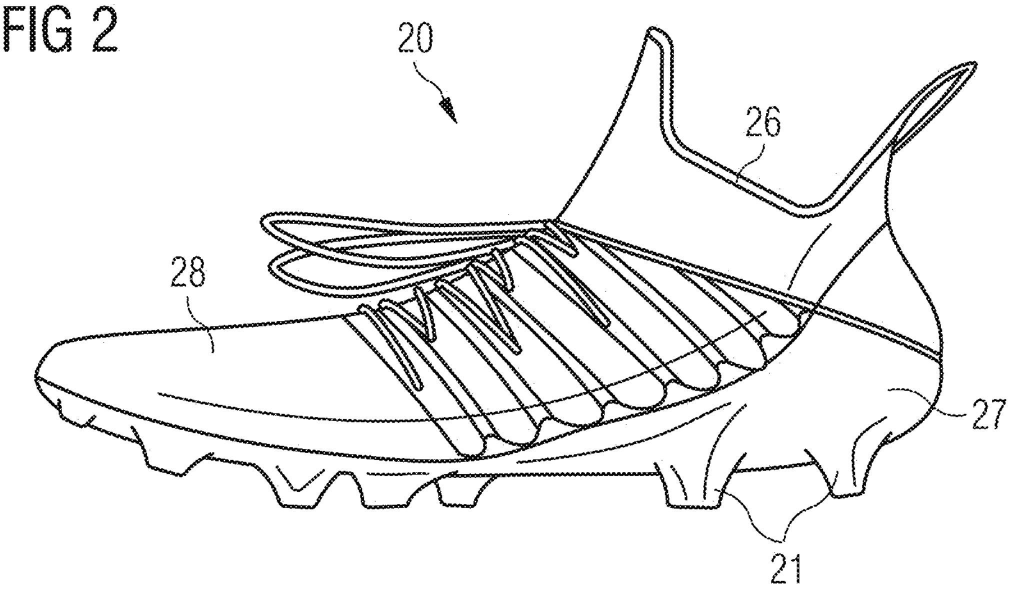
FIG 3A
FIG 3B
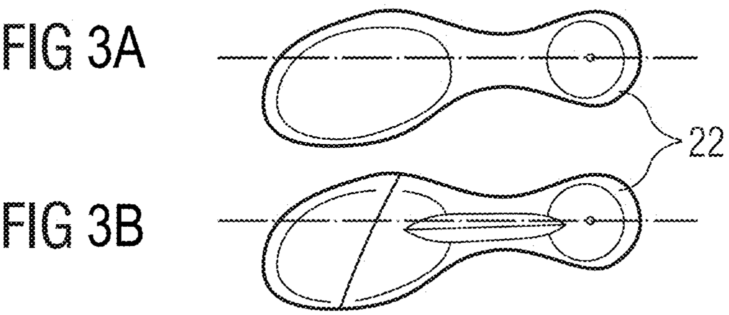

SPORTS SHOES AND METHODS FOR MANUFACTURING AND RECYCLING OF SPORTS SHOES

CROSS REFERENCE TO RELATED APPLICATION

This application is a divisional of U.S. application Ser. No. 16/139,797, filed Sep. 24, 2018, entitled Sports Shoes and Methods for Manufacturing and Recycling of Sports Shoes ("the '797 application"), which is a divisional of U.S. application Ser. No. 15/130,012, filed Apr. 15, 2016, entitled Sports Shoes and Methods for Manufacturing and Recycling of Sports Shoes ("the '012 application"), which is related to and claims priority benefits from German Patent Application No. DE 10 2015 206 900.1, filed on Apr. 16, 2015, entitled Shoes, in particular sports shoes, and methods for manufacturing and recycling of shoes ("the '900.1 application"). The '797, '012, and '900.1 applications are each hereby incorporated herein in their entirety by this reference.

FIELD OF THE INVENTION

The present invention relates to shoes, in particular sports shoes, and methods for manufacturing and recycling of shoes.

BACKGROUND

Shoes, in particular sports shoes, generally comprise a sole and an upper made from multiple components. Multiple components are generally required for a sole and an upper to provide the shoe with various desired properties such as cushioning, moisture management, traction, abrasion resistance etc. To this end, the various components of a shoe are typically manufactured from different materials. The components are then attached to each other, for example by adhesives and/or by stitching.

The production of the various components of a shoe and their respective materials requires a considerable amount of energy (e.g. electricity, heat, etc.) which leads to greenhouse gas emissions. Moreover, after a shoe's lifetime, e.g. when the shoe is worn out and can no longer be used, considerable efforts are needed to safely dispose of the shoe. In this context, special attention has to be paid to the various individual materials present within the shoe to optimize the disposal of the shoe. Again, energy is needed to decompose the materials and further greenhouse gases are emitted. On the other hand, the majority of worn out shoes still ends up in a landfill or in an incineration facility as waste. Numerous approaches are known to limit the amount of energy consumption and greenhouse gas emission during the life cycle of a shoe.

US 2009/0119023 A1 discloses a grading system for evaluating and ranking consumer products based on their ecological and/or environmental impact which is applicable for footwear. However, a mere ranking or evaluating falls short of providing shoes with reduced resource consumption and greenhouse gas emission during their life cycle.

US 2012/0233883 A1 discloses processes for fabricating an upper for a shoe in which scraps are obtained. Material scraps may be collected and resized and the resized scrap may be distributed to create a recovered material layer. The layer may be subjected to heat and/or pressure to create a pliable composite panel. The composite panel may be used to create an upper shell. US 2014/0066530 A1 discloses a method for recycling scrap ethylene-vinyl acetate (EVA) foam. A blend containing virgin EVA resin and scrap EVA foam, as well as a crosslinking agent and a blowing agent for the EVA resin is foamed and crosslinked. The blend further contains a compatibilizer, which is hydrogenated petroleum resin. The methods of US 2012/0233883 A1 and US 2014/0066530 A1 are based on the idea to re-use scraps, whereby pre-consumer waste (industrial waste) is used back in the production process. However, these methods do not go beyond addressing a possible re-use of waste during production of a shoe.

US 2014/0197253 A1 discloses a method for processing multiple polymer component articles for recycling. Polymer components of multi-component shoes may be separated. Therein, the differences in embrittlement and glass transition temperature of different polymer components are exploited by cryogenically freezing the prepared shoe and impacting it such that one polymer component is pulverized without substantially fracturing the remaining portion of the shoe. While this method addresses the recycling of multiple polymer component articles, it is a very complex and costly process that requires cryogenics.

DE 20 2012 005 735 U1 relates to a cycling shoe. The cycling shoe comprises an outer shoe, which comprises an upper and a sole, which may be fixedly attached to each other. For this particular cycling shoe, the outer shoe consists of a single material, in which case the upper and sole comprise a single layer only. Thermoplastic or thermosetting elastomers such as polyurethane, in particular thermoplastic polyurethane, may be used, possibly with fiber-reinforcement. The outer shoe may be releasably connected with an inner shoe. The inner shoe may also comprise a sole and an upper. It may consist of EVA.

EP 2 233 021 A2 relates to a protective sock for use in swimming pools or spas. The sock is of the type which are formed by two materials differentiated in the sole and the vamp. The sole is made of waterproof textile comprising polyamide between 60 and 75%, and polyurethane between 40 and 25%. The vamp comprises teflonized lycra.

U.S. Pat. No. 9,010,157 B1 relates to an article of footwear including a monofilament knit element with peripheral knit portions. DE 10 2013 208 170 A1 relates to sole for a shoe comprising a midsole and an outsole.

It has also become known in the field that shoes may be fabricated from bio-degradable material. Such shoes may naturally decompose within several months. However, the materials used in these shoes are not suitable for sports shoes and particularly do not meet the requirements for high-quality and high-performance shoes.

It may therefore be considered as a problem of the present invention to provide an improved approach for limiting the amount of resource consumption and greenhouse gas emission during the life cycle of shoes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a sports shoe comprises: an upper wherein a majority by weight of the upper is made from a thermoplastic base material; a sole, wherein a majority by weight of the sole is made from the same thermoplastic base material; wherein the sole and the upper are individually fabricated and joined to each other; and wherein the thermoplastic base material comprises at least one of the following materials: thermoplastic polyurethane (TPU), polyamide (PA), polyethylene terephthalate (PET), or polybutylene terephthalate (PBT).

In some embodiments, the thermoplastic base material is adapted to be recycled in a joint recycling process for the upper and the sole so that a recycled material from the sports shoe serves as a base material for the manufacture of a further product.

In certain embodiments, the further product comprises a further shoe and the further shoe comprises an upper and a sole that each comprise the recycled material. The further product, in some embodiments, comprises a ball, apparel, protective equipment, rackets, or clubs.

In some embodiments, the thermoplastic base material is selected from the group consisting of expanded TPU, polyester-based TPU, and polyether-based TPU.

In certain embodiments, the upper comprises a yarn comprising the thermoplastic base material. The upper, in some embodiments, includes a textile material, which comprises a yarn comprising the thermoplastic base material.

The sole, in some embodiments, comprises a foam comprising the thermoplastic base material. In certain embodiments, the sole comprises foamed pellets comprising the thermoplastic base material.

In some embodiments, the sole comprises a midsole comprising the thermoplastic base material or an outsole comprising the thermoplastic base material. The sole, in certain embodiments, comprises a midsole and an outsole such that the midsole and the outsole each comprise the thermoplastic base material.

In certain embodiments, at least a portion of the sole comprising the thermoplastic base material is adapted to provide a different grade of a physical property than at least a portion of the upper comprising the thermoplastic base material.

In some embodiments, the upper comprises different zones, wherein the different zones provide different grades of a physical property.

In certain embodiments, the upper comprises a reinforcing element. The reinforcing element, in some embodiments, comprises the thermoplastic base material. In some embodiments, the reinforcing element comprises a heel counter.

The thermoplastic base material, in certain embodiments, comprises material recycled from a sole or an upper of another shoe.

In some embodiments, the sports shoe further comprises a marker configured to store information for at least one of: a number of times the base material of the sports shoe has already been used in previous shoe, sales history for the sports shoe or a particular user, or remaining life of the sports shoe. The marker, in certain embodiments, comprises at least one of a Radio-Frequency Identification (RFID) tag, an Infrared (IR) marker, or a Near Infrared (NIR) marker. In certain embodiments, the marker is integrated in at least one yarn of the upper.

According to certain embodiments of the present invention, a method for manufacturing a sports shoe comprises: providing a thermoplastic base material; fabricating an upper, wherein a majority by weight of the upper is fabricated from the thermoplastic base material; fabricating a sole, wherein a majority by weight of the sole is fabricated from the same thermoplastic base material; wherein the sole and the upper are individually fabricated; and joining the sole and the upper to each other; wherein the thermoplastic base material comprises at least one of the following materials: thermoplastic polyurethane TPU, polyamide PA, polyethylene terephthalate PET, or polybutylene terephthalate PBT.

In some embodiments, providing the thermoplastic base material comprises recycling a sole or an upper of another shoe.

According to certain embodiments of the present invention, a method for recovering a base material from a sports shoe comprises: providing a sports shoe that comprises: an upper wherein a majority by weight of the upper is made from a thermoplastic base material; a sole, wherein a majority by weight of the sole is made from the same thermoplastic base material; wherein the sole and the upper are individually fabricated and joined to each other; and wherein the thermoplastic base material comprises at least one of the following materials: thermoplastic polyurethane TPU, polyamide PA, polyethylene terephthalate PET, or polybutylene terephthalate PBT; and jointly processing the upper and the sole of the sports shoe such that the thermoplastic base material is recovered from the sports shoe and can serve as a base material for the manufacture of a sports equipment product.

BRIEF DESCRIPTION OF THE DRAWINGS

In the following detailed description, embodiments of the invention are described referring to the following figures:

FIG. 1 is a side view of a shoe, according to certain embodiments of the present invention.

FIG. 2 is a side view of a shoe, according to certain embodiments of the present invention.

FIGS. 3A and 3B are top and bottom views, respectively, of an insole board of the shoe of FIG. 2.

BRIEF DESCRIPTION

This problem is at least partly solved by a shoe, in particular a sports shoe, according to claim 1. In some embodiments, the shoe comprises an upper, wherein a majority by weight of the upper is made from a thermoplastic base material. Moreover, the shoe comprises a sole, wherein a majority by weight of the sole is made from the same thermoplastic base material. The sole and the upper are individually fabricated and joined to each other. The thermoplastic base material may be a thermoplastic polyurethane (TPU), a polyamide (PA), a polyethylene terephthalate (PET) and/or a polybutylene terephthalate (PBT). However, also other materials may be used.

By providing shoes with a sole and an upper which—by majority or even entirely—consist of the same base material, the base material may be easily recovered from the shoe, which significantly reduces the effort needed for separating and/or sorting different shoe components. For example, the entire shoe may be treated in a single recycling step. The shoes according to the present invention may greatly simplify the recycling of used shoes, especially when the entire shoe is made from a single material. Moreover, the recovered base material may then be re-used both for the sole and the upper of a new shoe such that both parts may essentially be fabricated from the same recycled material. Using the same base material in an upper and a sole and at the same time providing a high-quality shoe is enabled by the idea that various physical implementations (e.g. yarn, foil, foam, pellets etc.) of one and the same chemical base material (e.g. thermoplastic polyurethane) may be used to provide the various different properties that are needed to provide high-quality shoes (e.g. cushioning, fit, moisture management, traction, abrasion resistance, good comfort and feel). Especially the use of TPU for all parts of the shoe enables the production a high performance shoe designed for athletes.

Generally, the components, parts, elements, etc., of the shoes disclosed herein may be joined permanently. In some embodiments, a shoe may not comprise any removable parts. Alternatively, some or all of said components parts, elements, etc., may be releasably joined.

Using the same base material in an upper and a sole allows for the benefit of using compatible materials which may be easily bonded, for example by applying energy, for example by heat. As an example, infrared (IR) heating could be used to melt the surfaces of two or more components such that, e.g. by pressing the melted surfaces on each other, the two or more components may be bonded. A bonding could also be achieved for example by a chemical bonding between the molecules.

Furthermore, using the same base material for the upper and the sole facilitates the joining of the two components, which may be achieved even without involving any adhesives, for example by applying energy, for example by heat, to melt the surfaces, as stated above.

Thus, an economically viable, at least partly closed material cycle may be created for many generations of shoes since the same base material may be recovered and re-used in a number of generations of shoes. For each new generation of shoes made from the same—recycled—material, the energy and greenhouse gas emissions for producing and safely disposing the material can thus be saved. As a result, compared to conventional shoes, not only energy and greenhouse gases required to decompose a shoe after its life cycle may be saved. What is more, also the energy required to produce the base material for a new shoe may be saved since the base material of the old shoe can simply be re-used. Even after accounting the additional energy to recycle and remanufacture a shoe from recovered thermoplastic material, the environmental footprint of the recycled shoe will be much lower than a similar conventional shoe which uses virgin thermoplastic material.

An at least partly closed material cycle means that, in certain embodiments, the re-used base material will be blended with new material. For example, the percentage of the new material may amount to 10-50%, or 15-20%, e.g. to ensure consistent resulting material properties.

Moreover, the use of a single base material for upper and sole of a shoe allows for a more cost-efficient sourcing of the base material and a more streamlined handling of the base material during manufacture. Thus additional cost benefits may be provided.

In certain embodiments, portions of the sole and the upper may be fabricated in a joint manufacturing step. The expression 'fabricating the sole and the upper individually' is intended to encompass soles and uppers wherein at least a portion of the sole and at least a portion of the upper that comprise the thermoplastic base material are fabricated separately. As a result, different physical properties may be provided for the sole and the upper despite using the same base material. In other examples, the entire sole and the entire upper may be fabricated separately.

In some examples, the sole and/or the upper comprise, by weight, more than 50%, more than 75%, or more than 95% of the same base material. In other examples, the sole and/or the upper comprise the same base material.

The thermoplastic base material of the shoe may be adapted to be recycled in a joint recycling process for the upper and the sole so that it can serve as a base material for the manufacture of a further upper and/or sole. In other words, a disassembly of the shoe may not be required. The entire shoe may be subjected to a joint recycling process to recover the base material. The recycled material could serve as a base material for the same kind of shoe or sports shoe product or for another shoe product. In principle the recycled material could serve as a base material for the manufacture of any other sporting goods products.

As mentioned, the thermoplastic base material of the shoe may be selected from one of the following materials: TPU, PA, PET and/or PBT. In certain embodiments, the thermoplastic base material is selected from one of the following materials: TPU, PA6, PA66, PA11, PA1010, PA612, PA610, PA1012, PA410, PA12 and/or polyether block amide (PEBA).

In some embodiments, the thermoplastic base material may be also selected from one of the following materials: expanded TPU, polyester-based TPU and/or polyether-based TPU. These materials have turned out to be suitable for use both in a sole and in an upper of a shoe. For example, by using TPU, a sole may provide good cushioning properties (e.g. using expanded TPU) and at the same time the upper may provide a good wearing comfort (e.g. using yarns made from TPU). The thermoplastic base material may then be recovered from the shoe after its life cycle in a simple recycling step and then reused for a new generation of shoes.

The upper of the shoe may comprise a yarn comprising the thermoplastic base material. The upper may be made of a textile material or include a textile material, which comprises a yarn comprising the thermoplastic base material. The textile material could be a knit textile, e.g. a warp knit and/or a weft knit. For example the weft knit could be flat knitted and/or circular knitted. For example the warp knit may be an engineered knit. Besides knit textiles, woven, non-woven, braided and/or other yarn-based fabric uppers may be provided which allow the provision of high quality uppers with a good wearing comfort. For example, a TPU yarn allows providing such uppers. The fabric component of the upper may be provided with a Shore-D hardness of 44-84, 54-74, or 62-66.

The sole of the shoe may comprise a foam which comprises the thermoplastic base material. By including material such as foams, good cushioning properties may be provided. For example, TPU foams may be used for this purpose. These also exhibit a good durability.

The sole of the shoe may comprise foamed pellets comprising the thermoplastic base material. For example, expanded TPU pellets may be used in this regard which provide excellent cushioning properties and longevity. For example, the materials described in DE 10 2012 206 094 and/or EP 2 649 896 may be used.

The thermoplastic base material of the sole may be injection molded, e.g. using injected TPU. Hence, the sole may be provided in a simple fabrication step. Other molding methods could be compression molding or steam molding.

Especially a steaming process may be used when the sole of the shoe comprises foamed pellets comprising the thermoplastic base material, e.g. expanded TPU pellets. The steam could further be used to melt the surface of the thermoplastic base materials of the outsole as well as the thermoplastic base material of the upper and make it bond to each other.

The sole of the shoe may comprise a midsole comprising the thermoplastic base material. Based on the configuration of a separate midsole, particularly optimized cushioning properties may be provided. The midsole may comprise a foam which comprises the thermoplastic base material, e.g. TPU foam or expanded TPU pellets as described above.

The sole of the shoe may further comprise an outsole comprising the thermoplastic base material. By using an additional outsole, the sole may be provided with good traction and abrasion resistance. The midsole and the additional outsole may thus each be optimized for their respective purpose.

The midsole may be provided with a Shore-A hardness of 60-100, 70-90, or 78-82. The outsole may comprise a Shore-A hardness of 40-80, 50-70, or 58-62.

The thermoplastic base material of the outsole may be injection molded, e.g. using injected TPU. Hence, the outsole may be provided in a simple fabrication step. For example, it may be directly injected onto the midsole. Alternatively, a separately fabricated outsole may be joined to the midsole e.g. based on the configuration of an adhesive comprising the base material, e.g. an adhesive based on TPU, or simply by applying energy, for example heat, as mentioned above.

At least a portion of the sole comprising the thermoplastic base material may be adapted to provide a different grade of an intrinsic physical property (e.g. hardness, density) than at least a portion of the upper comprising the thermoplastic base material. For example, certain portions of the upper may be adapted to be softer and/or less dense and/or more flexible than certain portions of the sole. This may be achieved e.g. by using TPU which is spun into a yarn for the upper and/or using expanded TPU and/or injection molded TPU for the sole. It is understood, that a majority by weight of the mentioned portions may be made from the thermoplastic base material.

The sole, in particular in case of a sole for a soccer shoe, may comprise at least one layer. At least one of the layers may be made from the same base material. The layers may nevertheless differ from each other. For example, at least one of the layers may have a different stiffness and/or hardness than at least one other layer. For example, an outer layer could be softer than an inner layer or vice versa. The different properties may be achieved by different geometric structures of the layers. Thereby the flexibility of the sole may be individually adjusted. The aspects described in the preceding paragraph with respect to a portion of the sole and a portion of the upper may equally apply to two different portions of the sole, e.g. to two different layers of the sole.

Additionally or alternatively, the sole, in particular in case of a sole for a soccer shoe, may comprise at least one profile element, e.g. stud. The at least one profile element may comprise or may be made from the thermoplastic base material.

The upper may comprise different zones, wherein the different zones provide different grades of an intrinsic physical property. For example two or more zones may be provided. Each such zone may comprise the thermoplastic base material, and a majority by weight of each zone may be made from the thermoplastic base material. In certain embodiments, the upper is produced by different elements, e.g. heel counter, vamp and/or toe cap, which are joined together to form the upper. Each of the individual elements may comprise certain intrinsic physical properties.

The thermoplastic base material of the shoe, e.g. of the upper and/or the sole may comprise material recycled from a sole and/or an upper of another shoe. Hence, an at least partly closed material-cycle may be provided. The base material used in the upper and the sole of a shoe may be jointly recycled and fully re-used in the fabrication of a new shoe. Hence, energy for disposing of the "old" base material and energy for producing "new" base material may be saved.

In some examples, the upper may comprise a heel counter and/or a reinforcing element comprising the thermoplastic base material, or consisting of the thermoplastic base material. For example, a lateral and/or a medial reinforcing element may be provided. The heel counter and/or the reinforcing element may help providing the shoe with stability as needed without compromising the ability to recycle the shoe.

For example, the upper may encompass a forefoot portion, a midfoot portion and/or a rearfoot portion of the foot of a user, and a heel counter and/or a reinforcing element may be provided which selectively stabilizes the upper in at least one of said portions. For example, the upper may comprise at least one fabric component comprising the thermoplastic base material, and a heel counter and/or a reinforcing element comprising the thermoplastic base material may be arranged in between the at least one fabric component and/or arranged on the at least one fabric component. Additionally or alternatively, a heel counter and/or a reinforcing element may be combined with at least one non-fabric component, as explained with reference to the fabric components. The heel counter and/or the reinforcing element may be permanently joined to the upper, in particular to the at least one fabric and/or non-fabric component. The heel counter and/or the reinforcing element may be provided at an outer face of the upper, in particular of the at least one fabric and/or non-fabric components. They may be stitched, glued (e.g. via a TPU hotmelt), or otherwise bonded or attached to the upper or at least one of its fabric or non-fabric components, e.g. as described herein. At least one heel counter and/or reinforcing elements may also be attached to the sole and extend from the sole to the upper. At least one heel counter and/or reinforcing elements may be provided using, e.g., any of the TPU materials as described herein as thermoplastic base material. At least one heel counter and/or reinforcing elements may be jointly fabricated.

At least one reinforcing element(s) may for example extend in a lateral and/or medial midfoot region and/or a lateral and/or medial heel region of the upper, in order to selectively increase the stability of the upper, there. In some examples, at least one reinforcing element(s) extend(s) from a lateral and/or medial heel region to a lateral and/or medial midfoot region. Additionally or alternatively, at least one reinforcement element may be attached in principle everywhere on the upper, for example in a toe region and/or an instep region of the upper. Thus, the fit of the shoe and the properties of the shoe (e.g., stiffness, grip, abrasion resistance) may be individually adjusted.

At least one heel counter(s) may for example extend in a heel region, in a lateral rearfoot region, in a medial rearfoot region, in a medial midfoot region, and/or in a lateral midfoot region. For example, a first heel counter may extend from a rear heel region to a lateral heel region and/or to a lateral midfoot region. A second heel counter may extend from a rear heel region to a medial heel region and/or to a medial midfoot region.

As the shoe, the upper and/or the sole, or any of the components of the shoe, the at least one reinforcing element and/or heel counter, may comprise, by weight, more than 50%, more than 75%, or more than 95% of the base material. In other examples, the at least one reinforcing element and/or heel counter may, just as any other component of the shoe, comprise the base material.

In some examples, laces may be provided which comprise the thermoplastic base material. For example, they may comprise a yarn comprising the thermoplastic base material, as described herein. In some examples, the laces may comprise the (yarn comprising the) thermoplastic base material. Laces may be permanently or releasably joined with the shoe. By using laces which comprise the thermoplastic base material, these may be recycled jointly with the shoe, without having to remove the laces from the shoe prior to recycling and to dispose of the laces separately.

Another aspect of the present invention relates to a method for manufacturing a shoe, in particular a sports shoe. The method comprises the steps of providing a thermoplastic base material and fabricating an upper, wherein a majority by weight of the upper is fabricated from the thermoplastic base material. Moreover, the method comprises the step of fabricating a sole, wherein a majority by weight of the sole is fabricated from the same thermoplastic base material. The sole and the upper are individually fabricated. The method further comprises the step of joining the sole and the upper to each other. The thermoplastic base material may be selected from one of the following materials: a TPU, a PA, a PET and/or a PBT. However, also other materials, as mentioned above, may be used.

This method allows for manufacturing a shoe as described herein with the same base material used in the sole and the upper. The method thus allows for manufacturing shoes with an at least partly closed material cycle, as described above.

The step of providing the base material may comprise the step of recycling a sole and/or an upper of another shoe. The other shoe may be a shoe according to the examples described herein wherein the base material used in the upper and the sole of that shoe is re-used.

A further aspect of the present invention relates to a method for recovering a base material from a shoe, in particular a sports shoe. The method comprises the following steps: A shoe as described herein is provided. The upper and the sole of the shoe are jointly processed such that the thermoplastic base material is recovered from the shoe and that it can then serve as a base material for the manufacture of a further sport equipment product, for example a further upper and/or sole.

The methods according to the invention should be seen as a platform technology. Any sporting goods product could theoretically be built from this platform. In certain embodiments, the recovered thermoplastic base material, for example from a shoe, serves as a base material for the manufacture of any other sporting goods products, for example for manufacturing balls, apparel, protective equipment, rackets, clubs and the like. In certain embodiments, the thermoplastic base materials of any sporting goods product, for example balls, apparel, protective equipment, rackets, clubs and the like may be recovered and re-used.

A further aspect of the present invention relates to a business model. A pair of shoes as described herein may be offered to a customer. After use of the shoe by the customer, e.g. after the life-cycle of the shoe, the manufacturer of the shoe may take back the shoe. For example, take-back stations may be provided in retail stores, and/or the customer may send back used shoes by mail. The manufacturer may recover the base material from the upper and the sole of the returned shoes and use it to produce a new pair of shoes comprising the recycled base material. In certain embodiments, the recycled base material is used for any sporting goods other than sports shoes, for example balls, apparel or other sports equipment, e.g. as mentioned above. According to various examples, vouchers and/or discounts for a new pair of shoes may be used as an incentive for the customer to return the shoes to the manufacturer. Also, a leasing model could be used, wherein the customer is charged with a (e.g. monthly) leasing rate and upon return of a used pair of shoes is provided with a new pair. The frequency at which a new pair of shoes is provided to the customer in a leasing model may depend on the type of shoes and/or may be a function of the leasing rate. For example, running shoes could be replaced at a frequency of at least one month and the frequency could increase if a higher leasing rate is paid. For football shoes, for example a replacement once a year (e.g. for every new season) could be appropriate. Another possibility is to use a subscription model in which a customer may get a replacement whenever a new model of a certain type of shoe is released.

A further business model according to the invention could be that customers buy their new sports equipment good, for example a pair of shoes as described herein, directly at the place where they want to do sports. For example, in some embodiments, vending machines or stores are located directly at the place where customers would like to participate in sports or activities such that the vending machines or stores contain or offer different kinds of shoes according to the invention. Thus, when a customer spontaneously decides to have a run, for example during walking through a park, the customer can have a pair of shoes according to the invention from the vending machine. In some embodiments, the customer has to pay a deposit for the pair of shoes. After running, the customer may return the used shoe to the vending machine or to a take-back station. In certain embodiments, the costumer gets back the deposit partly or alternatively the costumer gets a discount for another sport equipment good from the same manufacturer. The manufacturer may collect the used shoes and recovers the base material from the upper and the sole of the returned shoes and use it to produce a new pair of shoes comprising the recycled base material. In certain embodiments, the recycled base material is used for any sporting goods other than sports shoes, for example balls, apparel or other sporting equipment, e.g. as already mentioned. The shoes according to the present invention may simplify the recycling of the used shoes, especially when the whole shoe is made from a single material.

According to a further aspect, a marker, e.g. a Radio-Frequency Identification (RFID) tag or an Infrared (IR) marker, e.g. a Near Infrared (NIR) marker, could be incorporated into each new shoe or pair of shoes with a sole and an upper which comprises base material recovered from another shoe. The marker may indicate the number of times the base material of this pair of shoes has already been used in previous pairs of shoes. Thus, the customer could directly see how many life-cycles of a shoe the base material has already been able to support. Moreover, the marker could also indicate further information such as the customer's lease/subscription level. This would allow a full automation of the return and replacement handling at the manufacturer. Moreover, the marker could be used for alerting the customer when the shoes are worn out and/or when a new pair of shoes is available. Further, at least one IR marker could be incorporated into the material of the shoe to make the material identifiable among a multitude of other materials. For example, in some embodiments, IR markers are integrated in at least one yarn of the upper. Also, the various grades of the same base material that may be used in a shoe may thus easily be identified.

It should be noted that various aspects of the present invention may also be useful in sports goods other than sports shoes.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It is noted that in the following, only some embodiments of the present invention may be described in detail. The person skilled in the art readily recognizes that the specific details described with reference to these specific embodiments may be altered, developed further, combined in a different manner and that certain aspects of the specific embodiments described in the following may also be omitted. Moreover, it is noted that various aspects described in the subsequent detailed description may be combined with aspects described in the above summary section.

FIG. 1 shows a shoe 100 according to an example of the present invention. The shoe 100 comprises a sole 110 and an upper 120 with various components.

Sole 110 comprises a midsole 111 and an outsole 112. Midsole 111 comprises expanded TPU to provide cushioning, for example as described in DE 10 2012 206 094 and/or EP 2 649 896. For example, the expanded TPU may be provided in the form of pellets and may then be pressed into its desired shape by using steam. The midsole 111 may be provided with a Shore-A hardness of 60-100, 70-90, or 78-82, e.g. using TPU with 80 A, for example ELASTOLLAN® 1180 A TPU. Outsole 112 may be injected onto the midsole 111. Outsole 112 may comprise TPU with a Shore-A hardness of 40-80, 50-70, or 58-62, e.g. using TPU with 60 A, for example ELASTOLLAN® 1160 A TPU. Outsole 112 may be adapted to provide the sole with increased abrasion resistance and traction. In some examples, outsole 112 may be provided with at least one profile element which may be fabricated separately and joined with outsole 112 and/or which may be fabricated integrally with outsole 112.

Shoe 100 moreover comprises an optional torsion bar 113. Torsion bar 113 may be injected onto midsole 111 and/or outsole 112. Torsion bar 113 may comprise a TPU with a Shore-A hardness of 75-100, 85-98, or 93-97, e.g. using TPU with 95 A, for example ELASTOLLAN® 1195 A TPU. Torsion bar 113 may be adapted to increase the bending and torsion stiffness of sole 110 such that an improved wearing comfort is provided, particularly in the sensitive region of the arch of the foot.

Upper 120 of shoe 100 comprises an optional heel counter 124. Heel counter 124 may comprise a TPU with a Shore-A hardness of 75-100, 85-98, or 93-97, e.g. using TPU with 95 A, for example ELASTOLLAN® 1195 A TPU. Heel counter 124 may be injection molded in a separate fabrication step. Heel counter 124 may serve to provide increased stability to upper 120.

Upper 120 may comprise a fabric component 121 and optionally a reinforcing element 122 which both may comprise TPU fabric. Fabric component 121 comprises a TPU yarn. It may be knitted, woven, non-woven and/or braided fabric. For example, flat-knitting and/or 3D-knitting may be used to provide fabric component 121. For example, fabric component 121 may be weft-knitted and/or warp-knitted. Moreover, fabric component 121 may be present in a substantial portion of upper 120 or even throughout the entire upper 120 of shoe 100. For example, fabric component 121 may be arranged in a forefoot region, a lateral and/or a medial region and/or a heel region of the upper 120. Venting holes may be present in fabric component 121. Fabric component 121 may be provided with a Shore-D hardness of 44-84, 54-74, or 62-66, e.g. using TPU with 64 D, for example ELASTOLLAN® 1164 D TPU, and/or a Shore-A hardness of 75-100, 85-98, or 93-97.

Reinforcing element 122 may comprise a non-woven TPU fabric. Reinforcing element 122 may be arranged such that it comprises the shape of a line running from the lower heel region of upper 120 across the lateral and/or medial regions of the shoe towards an instep portion of upper 120 and/or around a tongue/lace region of upper 120. Reinforcing element 122 may be provided with a similar Shore-D hardness as fabric component 121, e.g. using TPU with 64 D, for example ELASTOLLAN® 1164 D TPU. However, reinforcing element 122 may have a higher tensile strength than fabric component 121 such that reinforcing element 122 may strengthen upper 120 of shoe 100. Additionally or alternatively, paddings and/or an insole cover may be provided which comprise a non-woven TPU fabric. In other examples, larger portions of the upper may comprise a non-woven element. However, some examples may not comprise any non-woven element.

Moreover, upper 120 of shoe 100 may comprise at least one patch of a film material, especially a TPU foil 123. The TPU foil may for example be provided with a Shore-A hardness of 75-100, 85-98, or 93-97 and/or a Shore-D hardness of 40-80, 50-70, or 58-62, e.g. using TPU with 95 A, for example ELASTOLLAN® 1195 A TPU and/or TPU with 60 D, for example ELASTOLLAN® 1160 D TPU. The TPU foil 123 may be arranged around a seam of upper 120. TPU foil 123 may be provided to reinforce upper 120. As desired, also other areas of upper 120 of shoe 100 may be provided with film materials, especially a TPU foil 123. In some examples, essentially the entire upper is coated with TPU foil.

Fabric component 121, reinforcing element 122, TPU foil 123 and heel counter 124 of upper 120 may be stitched to each other using a TPU yarn. Additionally or alternatively, a TPU bonding agent, for example a hot-melt TPU bonding agent, may be used. For example, heel counter 124 may be joined to upper 120 by a hot-melt TPU bonding agent. The bonding agent could e.g. be any TPU hot melt of an ether-base and/or an ester-based TPU hot melt. As a further option, infrared (IR) welding may be used in addition or alternatively to join the various elements of upper 120. Similarly, upper 120 of shoe 100 may be joined to sole 110 of shoe 100 by a TPU bonding agent 150, by stitching and/or by infrared welding, as described.

Based on the configuration of the various components 111-113, 150, 121-124, a shoe is provided which comprises a sole 110 and an upper 120, wherein a majority by weight of the upper 120 and of the sole 110 is made from a thermoplastic base material, namely TPU. Sole 110, upper 120 and the entire shoe 100 even comprise a single thermoplastic base material, namely TPU. Sole 110 and upper 120 are individually fabricated and joined to each other, as mentioned above. Sole 110 and upper 120 may thus be permanently joined. By using different physical implementations of the same chemical base material (e.g. TPU), the sole may be provided with good abrasion resistance, durability, traction and abrasion. At the same time, the upper may be provided with stability and softness such as to provide a nice wearing comfort.

It should be noted that also other thermoplastic materials, such as e.g. a PA, PET and/or PBT may be used as thermoplastic base material. Moreover, also material blends may be used as a common base material for the sole and the upper, as long as these provide suitable properties and may be jointly recycled.

FIG. 2 shows a further example for a shoe 20 according to the present invention. Shoe 20 comprises an inner sock 26. The inner sock 26 may comprise foamed TPU. The foamed TPU may be adapted to provide a soft feel and a good wearing comfort. The inner sock 26 may be arranged within a skeleton 27 and is adapted to fully encompass the foot of a user of shoe 20. In other examples the inner sock 26 may be adapted to only partly encompass the foot, e.g. a toe region may remain free from the inner sock 26. In certain embodiments, the inner sock 26 includes or is made of a textile material, which comprises a yarn comprising the thermoplastic base material. For example the textile material could be a knit, a woven fabric, a non-woven fabric, and/or another yarn-based fabric.

Skeleton 27 may comprise a heel counter and a sole plate as well as a series of optional straps around the instep region of shoe 20. The heel counter and the sole plate of skeleton 27 may comprise injection molded TPU. The injection molded TPU may be provided with a hardness as described above with reference to the injection molded TPU of shoe 100. The straps of skeleton 27 may comprise TPU foil and/or TPU fabric as explained above with reference to shoe 100. The straps may serve to secure the inner sock 26 within skeleton 27 and/or to provide shoe 20 with increased stability and strength.

Skeleton 27 may also comprise optional profile elements 21, such as studs which are adapted to penetrate the ground to improve traction when shoe 20 is used in outdoor environments. Additionally or alternatively, profile elements 21 may be provided by a sock element 28, as explained further below.

Sock element 28 may be arranged around skeleton 27. Sock element 28 may be provided in order to render shoe 20 water-resistant or water-proof. Moreover, desired friction properties for contacting a sports ball, e.g. a football, may be provided by a sock element 28. Sock element 28 may be adapted to essentially encompass the entire inner sock 26 and/or the entire skeleton 27. Sock element 27 may comprise a loop or a similar element at its top rear portion which facilitates arranging sock element 28 around skeleton 27 by the user of shoe 20. In some examples, sock element 28 may be adapted to encompass the foot of the user but not the ankle of the user. Alternatively, sock element 28 may only encompass a forefoot region of shoe 20 but not a heel region of shoe 20. Sock element 28 may comprise a TPU foil, for example as described with reference to shoe 100 above. The TPU foil could e.g. provide the shoe with water resistance, improved handfeel, certain traction properties, reinforcement and/or visual (design) purposes.

Sock element 28 may be arranged such that it encompasses the profile elements 21 provided by skeleton 27. Such profile elements 21 may be completely covered by sock element 28 and/or sock element 28 may comprise openings such that some or all profile elements 21 may extend through sock element 28. Additionally or alternatively, profile elements 21 may also be provided on sock element 28. These may for example be injection molded on sock element 28. Injected TPU as described above with reference to shoe 100 may be used for that matter.

Shoe 20 may comprise an optional insole board 22 which may be arranged within skeleton 27 or within the inner sock 26. A top and bottom view of an example insole board 22 are shown in FIGS. 3A and 3B, respectively. The insole board may comprise injection molded TPU as described for injection molded TPU with reference to shoe 100. The shape of insole board 22 may be adapted to the anatomy of the foot of a user. Moreover, insole board 22 may comprise a reinforcing element below the arch of the foot such that shoe 20 is provided with the required stability in this region of the foot by insole board 22.

Similarly as explained with reference to shoe 100, based on the configuration of its various components, shoe 20 comprises a sole and an upper, wherein a majority by weight of the upper and of the sole are made from the same thermoplastic base material, namely TPU. The example shoe 20 even comprises the one and the same thermoplastic base material TPU. Moreover, the elements 26, 27 and 28 as well as 22 which constitute the sole and the upper of shoe 20 and may all comprise TPU are individually fabricated and joined to each other, as mentioned above. The components may be joined permanently. Alternatively, some or all of said components may be releasably joined.

In particular, inner sock 26, skeleton 27, sock element 28 and/or insole board may be joined permanently.

It should be noted that various aspects of the present invention may also be useful in sporting goods other than sports shoes, for example balls, apparel or other sports equipment.

In the following, further examples are described to facilitate the understanding of the invention:

Example 1. Shoe, in particular sports shoe, comprising:

an upper (120), wherein a majority by weight of the upper is made from a thermoplastic base material;

a sole (110), wherein a majority by weight of the sole is made from the same thermoplastic base material;

wherein the sole (110) and the upper (120) are individually fabricated and joined to each other; and wherein the thermoplastic base material is selected from one of the following materials: thermoplastic polyurethane TPU, polyamide PA, polyethylene terephthalate PET, or polybutylene terephthalate PBT.

Example 2. Shoe according to Example 1, wherein the thermoplastic base material is adapted to be recycled in a joint recycling process for the upper (120) and the sole (110) so that it can serve as a base material for the manufacture of a further upper and/or sole.

Example 3. Shoe according to Example 1 or Example 2, wherein the thermoplastic base material is a PA selected from one of the following materials: PA6, PA66, PA11, PA1010, PA612, PA610, PA1012, PA410, PA12 or polyether block amide PEBA.

Example 4. Shoe according to one of Example 1 or Example 2, wherein the thermoplastic base material is selected from one of the following materials: expanded TPU, polyester-based TPU or polyether-based TPU.

Example 5. Shoe according to one of Examples 1-4, wherein the upper (120) comprises a yarn comprising the thermoplastic base material.

Example 6. Shoe according to one of Examples 1-5, wherein the upper includes a textile material, which comprises a yarn comprising the thermoplastic base material.

Example 7. Shoe according to Example 6, wherein the textile material is a knit, woven, non-woven, or braided material.

Example 8. Shoe according to Example 6 or Example 7, wherein the textile material is a warp knit or a weft knit.

Example 9. Shoe according to one of Examples 1-8, wherein the sole (110) comprises a foam comprising the thermoplastic base material.

Example 10. Shoe according to one of Examples 1-9, wherein the sole (110) comprises foamed pellets comprising the thermoplastic base material.

Example 11. Shoe according to one of Examples 1-10, wherein the sole (110) comprises a midsole (111) comprising the thermoplastic base material.

Example 12. Shoe according to Example 11, wherein the sole (110) further comprises an outsole (112) comprising the thermoplastic base material.

Example 13. Shoe according to Example 12, wherein the thermoplastic base material of the outsole (112) is injection molded.

Example 14. Shoe according to one of Examples 1-13, wherein at least a portion (111, 112, 113) of the sole (110) comprising the thermoplastic base material is adapted to provide a different grade of an intrinsic physical property than at least a portion (121, 122, 123, 124) of the upper (120) comprising the thermoplastic base material.

Example 15. Shoe according to one of Examples 1-14, wherein the upper comprises different zones, wherein the different zones provide different grades of an intrinsic physical property.

Example 16. Shoe according to one of Examples 1-15, wherein the upper comprises a heel counter and/or a reinforcing element.

Example 17. Shoe according to one of Examples 1-16, wherein the thermoplastic base material comprises material recycled from a sole and/or an upper of another shoe.

Example 18. Method for manufacturing a shoe, in particular a sports shoe, the method comprising:

- providing a thermoplastic base material;
- fabricating an upper, wherein a majority by weight of the upper is fabricated from the thermoplastic base material;
- fabricating a sole, wherein a majority by weight of the sole is fabricated from the same thermoplastic base material;
- wherein the sole and the upper are individually fabricated; and
- joining the sole and the upper to each other;
- wherein the thermoplastic base material is selected from one of the following materials: thermoplastic polyurethane TPU, polyamide PA, polyethylene terephthalate PET, or polybutylene terephthalate PBT.

Example 19. Method according to Example 18, wherein the step of providing the base material comprises recycling a sole and/or an upper of another shoe.

Example 20. Method according to Example 19, wherein the other shoe is a shoe according to one of Examples 1-17.

Example 21. Method for recovering a base material from a shoe, in particular a sports shoe, the method comprising:

- providing a shoe according to one of Examples 1-17;
- jointly processing the upper and the sole of the shoe such that the thermoplastic base material is recovered from the shoe and can serve as a base material for the manufacture of a sports equipment product, in particular a sole and/or an upper.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for recycling a sports shoe, comprising:

- providing a sports shoe, wherein the sports shoe comprises an upper with a fabric component and a sole comprising a midsole and an outsole
  - wherein the upper and the sole are individually fabricated and joined to each other;
  - wherein the upper and the sole each consist of an initial thermoplastic base material, wherein the initial thermoplastic base material is the same initial thermoplastic base material in the upper and in the sole;
  - wherein the fabric component comprises a yarn comprising the initial thermoplastic base material; and wherein the fabric component has a Shore-D hardness of 62-66;
  - wherein the outsole comprises a Shore-A hardness of 50-70;
  - wherein the initial thermoplastic base material is one of the following materials: thermoplastic polyurethane, polyamide, polyethylene terephthalate, or polybutylene terephthalate;
  - wherein the sole comprises foamed pellets;
  - wherein the upper comprises a reinforcing element wherein the reinforcing element comprises the initial thermoplastic base material;
- recycling the sports shoe in a joint recycling process for the upper and the sole to recover the initial thermoplastic base material; and
- forming a new sports shoe, wherein the new sports shoe comprises the initial thermoplastic base material and a new thermoplastic base material.

2. The method of claim 1, wherein the fabric component comprises at least one of weft-knitted fabric, warp-knitted fabric, woven fabric, non-woven fabric, or braided fabric.

3. The method of claim 1, wherein the outsole comprises injection molded thermoplastic polyurethane.

4. The method of claim 1, wherein the initial thermoplastic base material is thermoplastic polyurethane.

5. The method of claim 1, wherein the sports shoe further comprises an inner sock formed from the initial thermoplastic base material.

6. The method of claim 1, wherein the upper comprises an ankle opening, and wherein the upper comprises a film around the ankle opening, wherein the film is thermoplastic polyurethane foil.

7. The method of claim 1, wherein the initial thermoplastic base material in the sports shoe comprises recycled material.

8. The method of claim 1, wherein the upper comprises a heel counter.

9. The method of claim 1, wherein the sports shoe further comprises a marker to indicate the number of times the initial thermoplastic base material has been incorporated into previous pairs of shoes.

10. The method of claim 1, wherein the whole sports shoe is made from a single initial thermoplastic base material.

11. A method for recycling a sports shoe, comprising:

providing a sports shoe, wherein the sports shoe comprises an upper with a fabric component and a sole comprising a midsole and an outsole wherein the upper and the sole are individually fabricated and joined to each other;

wherein the upper consists of thermoplastic polyurethane and the sole consists of thermoplastic polyurethane;

wherein the sole comprises foamed pellets;

wherein the fabric component comprises a yarn comprising the initial thermoplastic base material; and wherein the fabric component has a Shore-D hardness of 62-66;

wherein the outsole comprises a Shore-A hardness of 50-70;

recycling the sports shoe in a joint recycling process for the upper and the sole to recover the thermoplastic polyurethane from the upper and the sole; and forming a new sports shoe, wherein the new sports shoe comprises the thermoplastic polyurethane recovered from the upper and/or the sole.

* * * * *